(12) United States Patent
Ens et al.

(10) Patent No.: US 10,983,023 B2
(45) Date of Patent: Apr. 20, 2021

(54) PRESSURE SENSOR ASSEMBLY AND MEASUREMENT TRANSDUCER FOR PROCESS INSTRUMENTATION WITH THE PRESSURE SENSOR ASSEMBLY

(71) Applicant: Siemens Aktiengesellschaft, Munich (DE)

(72) Inventors: Wolfgang Ens, Linkenheim (DE); Gilbert Alexander Erdler, Karlsruhe (DE); Stefan Klehr, Rheinzabern (DE); Stefan von Dosky, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 399 days.

(21) Appl. No.: 15/779,802

(22) PCT Filed: Aug. 2, 2016

(86) PCT No.: PCT/EP2016/068410
§ 371 (c)(1),
(2) Date: May 29, 2018

(87) PCT Pub. No.: WO2017/092887
PCT Pub. Date: Jun. 8, 2017

(65) Prior Publication Data
US 2020/0309628 A1    Oct. 1, 2020

(30) Foreign Application Priority Data
Nov. 30, 2015    (DE) .......................... 102015223784.2

(51) Int. Cl.
*G01L 9/00*    (2006.01)
*G01L 13/02*    (2006.01)
(Continued)

(52) U.S. Cl.
CPC .......... *G01L 9/0044* (2013.01); *G01L 9/0072* (2013.01); *G01L 13/025* (2013.01); *G01L 19/0618* (2013.01); *G01L 19/141* (2013.01)

(58) Field of Classification Search
CPC ... G01L 9/0044; G01L 9/0072; G01L 13/025; G01L 19/141; G01L 19/0618
See application file for complete search history.

(56) References Cited

U.S. PATENT DOCUMENTS 3,341,794 A * 9/1967 Stedman ............... G01L 9/0051
338/4
5,157,973 A    10/1992 Ciminelli
(Continued)

FOREIGN PATENT DOCUMENTS

CN        1401073          3/2003
CN     201138265 Y       10/2008
(Continued)

OTHER PUBLICATIONS

Office Action dated Aug. 30, 2019 issued in Chinese Patent Application No. 201680069607.2.

*Primary Examiner* — Jamel E Williams
(74) *Attorney, Agent, or Firm* — Cozen O'Connor

(57) ABSTRACT

A pressure sensor assembly includes a tube, wherein a membrane to which the pressure to be measured is applied is arranged in the cross-section of the tube, where the membrane has a high flexural rigidity in a central region and is mounted resiliently in the edge region in the tube via two limbs, and includes a device for detecting the axial displacement which is easily accessible from the outside on the outer side of the tube and is advantageously not in contact with the process medium, and where the pressure sensor assembly (Continued)

has a particularly simple structural configuration, and can be used advantageously in measurement transducers for process instrumentation.

6 Claims, 3 Drawing Sheets

(51) Int. Cl.
*G01L 19/06* (2006.01)
*G01L 19/14* (2006.01)

(56) References Cited

U.S. PATENT DOCUMENTS

| | | | |
|---|---|---|---|
| 5,763,784 A | 6/1998 | Biskup | |
| 5,796,007 A * | 8/1998 | Panagotopulos | G01L 9/0089 73/716 |
| 7,219,551 B2 * | 5/2007 | Suzuki | G01L 9/0072 73/716 |
| 8,281,665 B2 * | 10/2012 | Dukart | G01L 9/0064 73/715 |
| 10,612,990 B2 * | 4/2020 | Klehr | G01L 19/0618 |
| 2001/0032515 A1 * | 10/2001 | Willcox | G01L 13/026 73/715 |
| 2002/0020221 A1 | 2/2002 | Sittler et al. | |
| 2004/0045360 A1 * | 3/2004 | Andrea | G01L 9/0019 73/721 |
| 2010/0212435 A1 * | 8/2010 | Sato | G01L 9/008 73/717 |
| 2011/0167918 A1 | 7/2011 | Dukart et al. | |
| 2012/0265455 A1 | 10/2012 | Tham et al. | |
| 2018/0238722 A1 * | 8/2018 | Erdler | G01F 1/42 |
| 2018/0245999 A1 * | 8/2018 | Erdler | G01L 9/0064 |

FOREIGN PATENT DOCUMENTS

| | | |
|---|---|---|
| CN | 102686992 | 9/2012 |
| DE | 9300776 | 5/1993 |
| DE | 19608321 | 8/1997 |
| DE | 102014212765 | 1/2015 |
| EP | 2294376 | 3/2011 |

\* cited by examiner

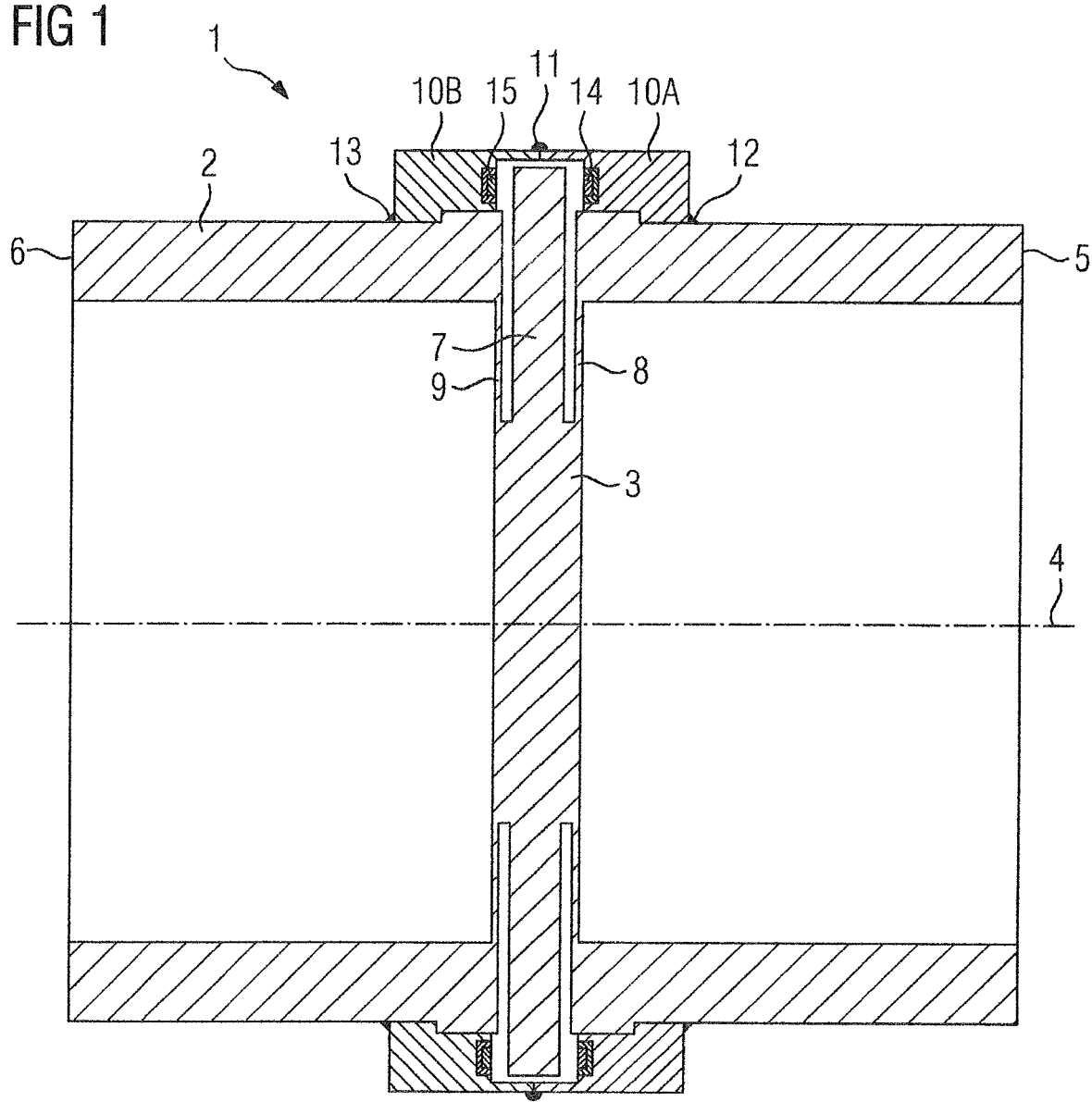

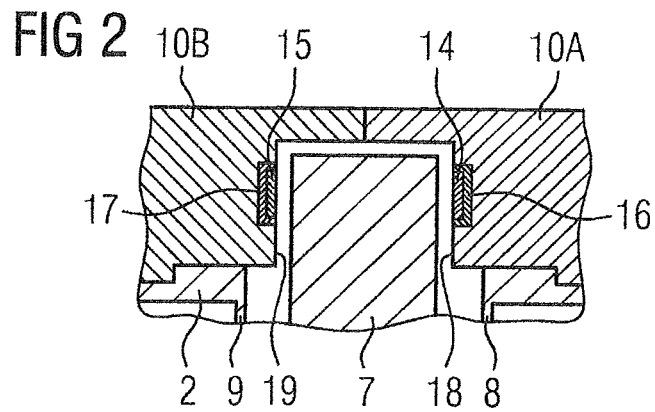
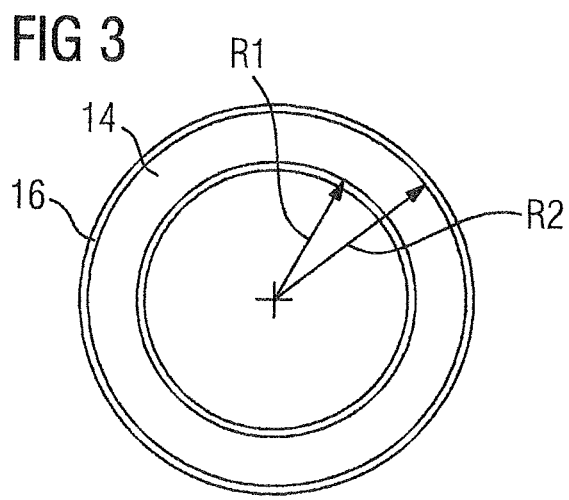
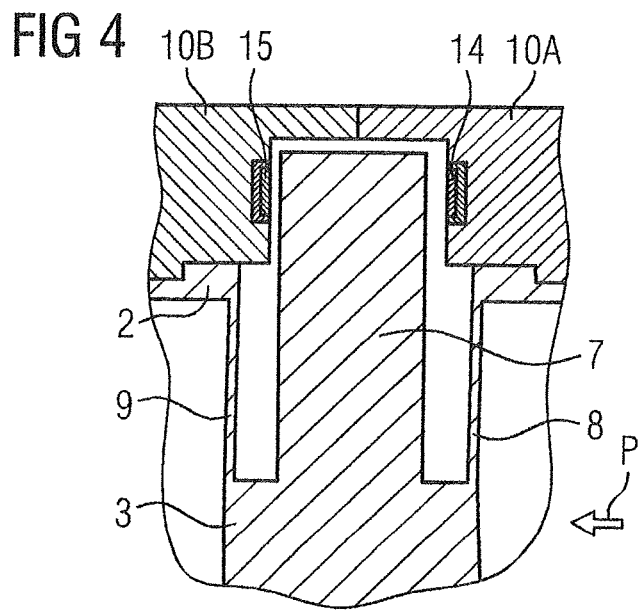

PRESSURE SENSOR ASSEMBLY AND MEASUREMENT TRANSDUCER FOR PROCESS INSTRUMENTATION WITH THE PRESSURE SENSOR ASSEMBLY

CROSS-REFERENCE TO RELATED APPLICATIONS

This is a U.S. national stage of application No. PCT/EP2016/068410 filed Aug. 2, 2016. Priority is claimed on German Application No. DE102015223784.2 filed Nov. 30, 2015, the content of which is incorporated herein by reference in its entirety.

BACKGROUND OF THE INVENTION

1. Field of the Invention

The invention relates to a pressure sensor assembly with a tube, in whose cross-section a membrane to which the pressure to be measured is applied pressure is arranged, and a measurement transducer for process instrumentation with such a pressure sensor assembly.

2. Description of the Related Art

In process technology plants, diverse field devices are employed for the process instrumentation to control processes. Measurement transducers serve to record process variables, such as temperature, pressure, flow rate, fill level, density or gas concentration of a medium. The process flow can be influenced by actuators, depending on recorded process variables, according to a strategy predefined, for example, by a programmable logic controller or a control station. Examples of actuators that can be mentioned here include a control valve, a heater or a pump. Particulary in process technology systems, pressure measurement transducers represent important sensor-related components within the framework of automated production workflows. With a view to optimal system behavior and a sustainably high product quality, high quality measurement transducers are necessary, which deliver measured values that are stable over the long term and not greatly fault-prone even under extreme conditions.

DE 196 08 321 C2 discloses a pressure sensor assembly with an overload protection system, which can be employed as a sensor or measurement cell in a measurement transducer for differential pressure. The conventional measurement cell is filled with oil, so that the actual pressure sensor is separated from a possibly aggressive process medium. The overload protection system comprises a multiplicity of mutually corresponding membranes and an oil charge precisely matched thereto. The construction of such a measurement cell is accordingly comparatively complex and a great number of welding processes are required for manufacture of the measurement cell. In addition, the geometry of the parts, the material characteristics and the welding parameters are subject to exacting precision requirements. The electrical contacts of the actual pressure sensor must, for example, be routed via high-pressure resistant glass feedthroughs from the interior of the measurement cell, which is subject to pressure, outwards to an electronics unit, in which the signal processing for determining the pressure measured value is performed. In addition, the measurement cell is only to some extent vacuum-proof, and can also be used only for a comparatively limited temperature range. In the case of hygiene-related applications, in which the danger of contamination of the process medium with oil absolutely must be prevented, the measurement cell cannot be used.

EP 2 294 376 B1 discloses a further pressure sensor assembly. Here, a membrane with a multiplicity of membrane sections angled relative to each other is used to detect pressure. One membrane section is arranged as a separator membrane in the cross-section of a pressure tube and a membrane section at an angle thereto as a sidewall membrane in the area of the pressure tube wall. A pressure difference applying to the separator membrane results in its deformation, which as a result of a fixed angle between the two membrane sections is transmitted to the sidewall membrane, so that the deformation of the sidewall membrane thereby caused, likewise reflects the pressure ratios within the pressure tube. A device for detecting a deformation of the membrane is arranged on the outer side of the sidewall membrane, so that these are not in contact with the medium whose pressure is to be measured. As a result of the arrangement of the first membrane section as a separator membrane in the cross-section of the tube, the conventional pressure sensor assembly can be used both as an absolute pressure sensor and also as a differential pressure sensor, depending upon whether a defined reference pressure is exerted on one side of the separator membrane or the separator membrane has a pressure to be measured applied to both sides. The conventional pressure sensor assembly is provided for use within the framework of monitoring diesel particle filters, in order to measure the exhaust gas pressure upstream and downstream of the particle filter and thus to determine the status of its loading. In contrast to process instrumentation, a low static pressure at most arises here. However, in the case of the pressure sensor assembly described, the differential pressure measurement is disadvantageously highly dependent upon the static pressure, which in particular leads to a deformation of the sidewall membrane, and its compensation is only possible to an insufficient degree, as this presupposes an exact positioning of the extensometer applied to the external wall of the tube, which in practice is scarcely achievable with the requisite precision.

DE 93 00 776 U1 discloses a pressure sensor having a box-like housing, which is divided into two measuring chambers by an annular membrane. The membrane is corrugated via centrally arranged rings and formed in the central area as a disk-shaped pressure wall. A pressure difference in the two measuring chambers leads to an axial displacement, which is recorded by an inductive sensor. Disadvantageously, the inductive sensor is here arranged within a measuring chamber.

SUMMARY OF THE INVENTION

It is an object of the invention to provide a pressure sensor assembly having a simple structural configuration, and is at the same time suitable for use in a measurement transducer for process instrumentation.

These and other objects and advantages are achieved in accordance with the invention by a pressure sensor assembly and a measurement transducer for process instrumentation with such a pressure sensor assembly having the advantage that an axial displacement of a membrane, which has high flexural rigidity and is mounted resiliently in the edge region of a tube in the axial direction, occurs in the vicinity of the tube wall, and it is thereby possible to detect this axial displacement in effect from outside using measurement technology.

In particular, compared with the conventional pressure sensor assembly disclosed in DE 196 08 321 C2 and cited in the introduction, the new arrangement with a tube, in whose cross-section a membrane to which the pressure to be measured is applied is arranged, has the advantage that it is structurally considerably simpler, because no oil filling, no corresponding overload protection system, no pressure-tight glass feed-through and fewer welded joints are required. A sensor for detecting the axial displacement of the membrane can advantageously be arranged outside of the wetted space, such that no interaction between the sensor and filling oil or process medium can occur. A pressure sensor assembly with high long-term stability and a robust design can thereby be obtained.

Filling oil is not used. As a result, the cited problems of limited vacuum resistance, a comparatively limited temperature range and lack of suitability for hygiene-related applications no longer arise with a new pressure sensor assembly equipped with a measurement transducer.

An advantageously simple configuration of a resilient mounting of the membrane in the tube in the axial direction, i.e., in a direction parallel to the tube axis, is obtained in that this is realized via a suspension with two limbs extending essentially parallel to the plane of the membrane, formed in rotational symmetry in relation to the tube axis. In this connection, the expression "essentially parallel" is taken to mean that the limbs are each inclined at an angle of at most 10° relative to the plane of the membrane. The inclination is here described as the angle enclosed between a notional line of connection, which links the limb connection points on the membrane and on the tube to each other as a straight line, and the plane of the membrane, where the line of connection cuts (intersects) the tube axis. An inclination of the two limbs of the membrane suspension by a small angle relative to the plane of the membrane can be achieved, for example, in that two originally parallel limbs are displaced from their parallel position, which can also be designated the zero position, via mechanical pretensioning. The two limbs are thus always outside of their zero position, both in the case of zero pressure and across the entire pressure measurement range. Such an angular position of the limbs has the advantage that a possible snap action effect, i.e., an abrupt axial displacement of the membrane upon exceeding of the zero position, can be prevented. Without this measure, the described snap action effect could possibly lead to a hysteresis in a measurement signal obtained via the device for detecting the displacement.

To form the two limbs, the front face of the membrane is provided with at least one groove extending into the membrane in a radial direction. This has the advantage that with a particularly simple construction and straightforward manufacture, a suspension with two flat washers, essentially lying parallel to each other or bent (in the case of the pretensioning of the limbs described above), are obtained as springing, the arrangement of which in a longitudinal section along the tube axis resembles a parallelogram or a trapezium with a small opening angle of the limb.

In principle, a very wide variety of measurement methods can be used to detect the axial displacement of the membrane, dependent upon the pressure being measured. For example, optical measurement using a laser, a capacitive measurement with suitably applied electrodes, a magnetic or ultrasound measurement may be employed. However, an embodiment of the invention in which the device for detecting the axial membrane displacement is arranged on the outer side of the tube has proved particularly advantageous. In particular, due to the space constraints they are simple to attach and if necessary adjust there. To this end, the axial displacement of the central region of the membrane, which has high flexural rigidity, is transmitted radial outwards. As a result, it can be indicated on the outer side of the tube, and thus detected for generation of a corresponding measurement signal. Selection of the suitable device of transmission, for example optical, capacitive, magnetic, via ultrasound or mechanical, can occur dependent upon the respective measurement method used to detect the axial displacement.

In a particularly advantageous embodiment of the invention, the front face of the membrane for formation of the two limbs is provided with two grooves extending into the membrane in a radial direction and the strip between the two grooves is formed as a mechanical means of transmission, which at least partially overhangs the outer side of the tube in a radial direction and, thus, directs the axial displacement of the membrane to the outer side of the tube, so that this can be detected in a particularly simple manner for generation of a measurement signal. The two grooves are preferably manufactured symmetrically in relation to the central plane of the membrane via milling or turning. Such a pressure sensor assembly is particularly simple to produce and thus cheap to manufacture.

In accordance with a particularly advantageous embodiment of the invention, two capacitors with annular electrodes at least partially surrounding the circumference of the tube can be used as the device for detection of the axial displacement, where the one electrode of the one capacitor is realized on or with the one side of the strip and the one electrode of the other capacitor is realized on or with the opposite side of the strip in the axial direction, so that the capacitances of the two capacitors upon axial displacement of the membrane change inversely to each other. The two capacitors thus generate a differential measurement signal, which can be analyzed to determine the displacement and thus the pressure to be measured, via a subsequent signal processing. Compensation for the temperature influences or the static pressure is thus enabled in an advantageous manner. With a corresponding embodiment of the radial membrane extension, this can serve directly as an electrode or separate bilateral electrodes, which are electrically isolated from the membrane extension, can be applied to the opposite sides of the membrane extension.

In accordance with a further particularly advantageous embodiment of the invention, the respective other electrodes of the two capacitors are arranged on the axially opposite internal sides of a ring cap overlapping the strip. In an advantageous manner, such a ring cap, which can be manufactured from two annular moldings, has the additional function of a protective cap, which protects the capacitors against dirt or damage. The ring cap can advantageously also serve to realize an overload protection system. To this end, the ring cap can be provided with an annular groove corresponding to the strip and encircling its edge, which comprises stop surfaces on its opposing sides for the strip to limit its axial displacement in the case of overloading. An overload protection, by which a plastic deformation or cracking of the limbs can be prevented in the case of strong pressure loading, can be obtained in this manner with particularly simple structural means. This type of realization of an overload protection further has the advantage that the components used to this end are separated from the process medium and in particular in the case of aggressive media are protected from these.

As a result of the robustness, pressure- and vacuum resistance and its insensitivity to static pressure and temperature, the new pressure sensor assembly is particularly suitable for use as a measurement cell or sensor in a measurement transducer for process instrumentation purposes.

The invention, embodiments and advantages are illustrated in greater detail below on the basis of drawings representing exemplary embodiments of the invention, in which:

FIG. 1 shows a longitudinal section through a pressure sensor assembly in accordance with the invention;

FIG. 2 shows an edge region of a pressure sensor assembly as a longitudinal section in accordance with the invention;

FIG. 3 shows a top view of an annular electrode in accordance with the invention;

Figure 5:
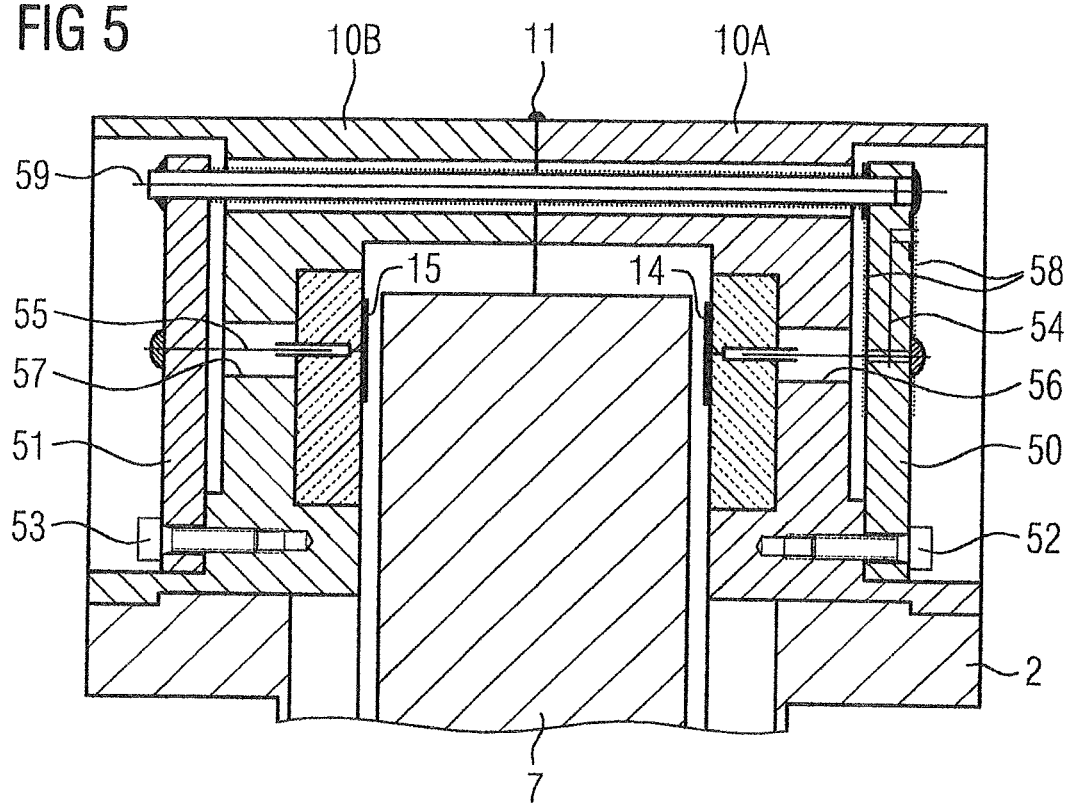
Figure 6:
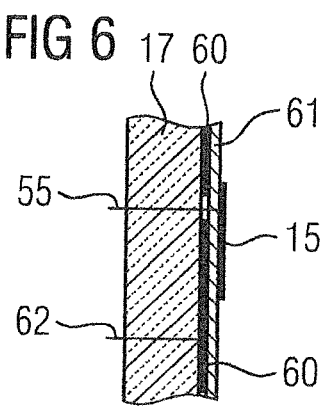

FIG. 4 an edge region of a pressure sensor assembly under loading in accordance with the invention;

FIG. 5 shows an edge region of a pressure sensor assembly as a longitudinal section with visible electrode connections in accordance with the invention; and FIG. 6 shows the structure of an electrode with shielding in accordance with the invention.

DETAILED DESCRIPTION OF THE EXEMPLARY EMBODIMENTS

In the Figures, the same parts are provided with the same reference characters.

In the longitudinal section according to FIG. 1, the fundamental form of a pressure sensor assembly 1 with a tube 2, in whose cross-section a membrane 3 to which the pressure to be measured is applied is arranged, can readily be discerned. The form of the pressure sensor assembly 1 is essentially in rotational symmetry in relation to a longitudinal axis 4. In the case of the use of the pressure sensor assembly 1 shown in a pressure measurement transducer for process instrumentation purposes, the two ends 5 and 6 of the tube 2 can each be closed by a cap not represented in FIG. 1, via which process medium can be fed, with the pressure to be measured, onto one side of the membrane 3 in the case of an absolute pressure sensor or two sides of the membrane 3 in the case of a differential pressure sensor. An electronic unit for analysis of the electrical signal generated by the pressure sensor assembly 1, and dependent in each case on the pressure to be measured, can be created in a conventional manner, and is likewise not shown in FIG. 1. Membrane 3 takes the form of a comparatively thick membrane disk with high flexural rigidity in the central region, which has narrow radial slits on both sides in the edge region for the creation of two grooves, so that between the two grooves a strip 7 and on the mutually opposite sides of the membrane 3 a limb 8 or a limb 9 remain. The two limbs 8 and 9 have low flexural rigidity and thus serve to provide resilient mounting of the membrane 3 in the axial direction.

Tube 2 and membrane 3 can be manufactured from a piece of steel by turning. The strip 7 is formed as a radial membrane extension and transmits an axial displacement of the membrane 3 to the outer side of the tube 2, which partially overhangs the strip 7 in a radial direction. Mounted on the outer side of the tube 2 is a ring cap, comprising two moldings 10A and 10B. The two moldings 10A and 10B are permanently connected to each other at a joint via a welded seam 11 and welded to the tube 2 by welded seams 12 or 13, respectively. The strip 7 projects into a groove of the ring cap 10A, 10B, in which, as will subsequently be explained in even greater detail at a later stage, devices for detecting the displacement of membrane 3 are arranged.

In FIG. 1, it is clear that when using a membrane 3, which is resiliently mounted in the tube 2 in the edge region via two limbs 8 and 9 in the axial direction, the structural configuration of a pressure sensor assembly 1, which is also described as a measurement cell, is significantly simplified compared with a conventional measurement cell an with overload protection system and filling oil as the diaphragm seal. In the case of a differential pressure measurement transducer, the process medium is conveyed directly to the two sides of the membrane 3 and no oil filling and no complex design engineering of an overload protection system are necessary. Welding processes are required only to a limited extent and a pressure-resistant glass feed-through for electrical signals can be dispensed with. In addition, tube 2 and membrane 3 can largely be manufactured via turning. The dimensions of the measurement cell can be configured such that it is compatible with conventional measurement cells with respect to their mechanical interfaces to the remaining components of a measurement transducer, so that only the measurement cell, i.e., the pressure sensor assembly 1 shown, needs to be replaced, and flange parts, housing etc. can be adopted from conventional measurement transducers.

Devices for capacitive detection of the displacement of the membrane 3, which are arranged on the outer side of the tube 2, are explained in greater detail below based on FIGS. 2 and 3. In the illustrated exemplary embodiment, the strip 7, which is formed as a radial membrane extension, with its axially opposite lateral surfaces, each form an electrode of two capacitors. To this end, the strip 7 is manufactured from electrically conductive material, such as stainless steel. The other electrode 14 of the one capacitor and the other electrode 15 of the other capacitor are embedded in an electrically insulating bearer ring 16 or an electrically insulating bearer ring 17, and thus insulated against short circuits. Stop surfaces 18 or 19 are each formed on the moldings 10A and 10B, upon which the strip 7 comes to rest upon overloading. Bending of the limbs 8 and 9 is thereby limited in the case of overloading, so that plastic deformation or cracking can be prevented.

FIG. 3 shows an exemplary view for example of the electrode 14, that is embedded in the bearer ring 16. The electrode 14 which encircles the circumferential area of the tube 2 (FIG. 2) is embodied in the form of a washer with an internal radius $R_1$ and an external radius $R_2$. With a gap d between strip 7 and electrode 14 the capacitance $C_0$ of the one capacitor, which is formed by the one side of the strip 7 as the one electrode and the electrode 14 as the other electrode, can be calculated in accordance with the relationship:

$$C_0 = \epsilon_0 \frac{(R_2^2 - R_1^2)\pi}{d}, \qquad \text{Eq 1}$$

where $\epsilon_0$—electric constant.

In the case of a pressure measurement cell with, for example, a 50 mm diameter, a width R2-R1 of the electrode 14 of 2.5 mm and a gap of 0.2 mm gives a capacitance $C_0$ of the capacitor of 16.5 pF. If, for example, with a corresponding compressive load on the membrane 3, the gap d decreases by only 50 µm, the capacitance increases by 5.5 pF to 22 pF, while the capacitance of the respectively other capacitor decreases by 3.3 pF. These changes in capacitance are readily detectable with a high-resolution capacitance digital converter.

The flexing of the limbs 8, 9 under a pressure loading P of the membrane 3 is illustrated based on FIG. 4. In the longitudinal section, the bilateral narrow radial slitting of the membrane 3 is easily visible. A radial suspension of the membrane 3 in a form resembling a parallelogram is thereby created in the tube 2 with the two limbs 8 and 9. In the case of the compressive load status of the membrane 3, as shown with a pressure P on the right-hand side of the membrane 3, the membrane 3 undergoes an axial displacement to the left. Here, the gap of the capacitor formed with the electrode 14 is increased, while the gap of the capacitor formed with the electrode 15 is decreased. A counter-rotating measurement signal is thus obtained, with the advantage that influences of the static pressure and temperature, which can lead to changes in the expansion of the pressure sensor assembly, have scarcely any effect on the measured result. With an appropriate configuration of the thickness of the limbs 8 and 9 and their length, the pressure range can be varied, so that the pressure sensor assembly measurement transducer can be realized for different pressure ranges with essentially the same structure.

FIG. 5 represents a possible realization of the electrical connections for the two capacitors. The moldings 10A and 10B, which are formed in a rotationally symmetrical manner and overlap the outer side of the tube 2 across the entire peripheral region, are each provided with a milled recess for mounting a circuit board 50 or 51 respectively at one location in the peripheral region. The boards 50 and 51 are each fixed on the moldings 10A or 10B respectively via a screw 52 or 53, respectively. A line 54 contacts the electrode 14, a line 55 the electrode 15. The lines 54 and 55 are routed through drilled holes 56 or 57, respectively. In order that the connection of a cable, which is not represented in FIG. 5 and serves to transmit the measurement signals to an analysis device which is likewise not shown, can occurs from one side, the line 54, which is provided with a guarding feature 58 within the circuit board 50, is routed through a further drilled hole in the moldings 10A and 10B, via a shielded line 59, to the left-hand side, where the connection to the electrode 15 is also located.

In the exemplary embodiment illustrated in FIGS. 1 through 5, the one electrode of the two capacitors is formed by the strip 7 and is thus at ground potential. This facilitates the electrical contacting, because no separate line is required for this electrode connection. Here, it is advantageous to protect electrodes 14 and 15 respectively against ground potential at the rear because, otherwise, parasitic capacitances would arise, which would lie electrically parallel to the actual capacitors. One possibility for the realization of such shielding is shown for the example of electrode 15 in FIG. 6. The electrode 15 and an associated shielding 60 are realized via suitable metalizations of a polyimide film 61 metalized on both sides, and applied as a multi-layer conductor board to a PCB material as a bearer ring 17. This is a usual method for the manufacture of PCBs. Electrical connection lines 55 and 62 are accessible via through-contacts.

The advantages of the pressure sensor assembly in accordance with the disclosed embodiments are once more briefly set out in summary form below. With radial milling of the membrane with defined geometric parameters an innovative measurement cell with a pressure membrane is created, which is largely rigid and nevertheless pressure-sensitive due to the special suspension of the membrane. Thanks to clever positioning of electrode surfaces, the parallelogram-like elastic membrane suspension enables capacitive detection and conversion of the pressure-proportional mechanical deflection into an electrical measurement signal. Thanks to the symmetry of the arrangement, a differential measurement signal is generated, which is linked to positive temperature compensation properties and compensation of static pressure influences. Due to the high flexural rigidity of the membrane a stable mechanical overload protection can be integrated, which prevents excessive deflection of the membrane in the event of overloading. Here, the pressure sensor assembly manages without oil filling, including when used as a differential pressure measurement cell. As the overload protection is not in contact with the media, neither is there any danger of adhesion. From the zero position, the limbs can be provided with a reverse pretensioning, in order to reliably prevent a snap action effect, which could otherwise possibly occur. Due to the generation of a differential measurement signal, the susceptibility to interference is comparatively low. As the capacitors are located in a hermetically sealed space, it is also the case that no external parasitic capacitances can falsify the measurement signal. Due to the absence of an oil filling, the pressure sensor assembly can be used within a comparatively wide temperature range, and manufactured in a vacuum-proof and cost-effective manner.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressure sensor assembly comprising:
   a tube;
   a membrane to which pressure to be measured is applied arranged in a cross-section of the tube, the membrane having a high flexural rigidity in a central region and being resiliently mounted in the tube in an axial direction in an edge region, the resilient mounting being formed via a suspension with two limbs which extend essentially parallel to a plane of the membrane and which are in rotational symmetry in relation to a tube axis;
   a device for detecting an axial displacement of the membrane, which is dependent upon the pressure and is arranged on an outer side of the tube;
   at least one groove extending into a front face of the membrane in a radial direction to form two limbs; and
   a transmission device via which axial displacement is displayable on the outer side of the tube.

2. The pressure sensor assembly as claimed in claim 1, wherein the front face of the membrane includes two grooves which extend into the membrane in a radial direction to form the two limbs;
   wherein transmission device comprises a strip arranged between the two grooves; and
   wherein the strip at least partially overlaps the outer side of the tube in a radial direction.

3. The pressure sensor assembly as claimed in claim 2, wherein device for detecting axial displacement comprises two capacitors having electrodes at least partially surrounding a circumference of the tube; wherein one electrode of a capacitor of the two capacitors is realized on or with one side of the strip and another electrode of another capacitor of the two capacitors is realized on or with an axially opposite side of the strip, such that capacitances of the two capacitors change inversely upon axial displacement of the membrane.

4. The pressure sensor assembly as claimed in claim 3, wherein a respective other electrodes of the two capacitors are arranged on axially opposite internal sides of a ring cap overlapping the strip.

5. Pressure sensor assembly as claimed in claim 4, wherein the ring cap has an annular groove corresponding to the strip and encircling an edge of the strip, which comprises stop surfaces for the strip to limit the axial displacement of the membrane in cases of overloading.

6. A measurement transducer for process instrumentation having the pressure sensor assembly as claimed in claim 1.

* * * * *